United States Patent
Ananthanarayanan et al.

(10) Patent No.: US 9,167,543 B2
(45) Date of Patent: *Oct. 20, 2015

(54) SYNCHRONIZATION OF MOBILE CLIENT MULTICAST

(71) Applicant: Aruba Networks, Inc., Sunnyvale, CA (US)

(72) Inventors: Shankar Kambat Ananthanarayanan, JP Nagar III Phase (IN); Ravinder Verma, Varthur Hobli (IN)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 149 days.

This patent is subject to a terminal disclaimer.

(21) Appl. No.: 13/968,256

(22) Filed: Aug. 15, 2013

(65) Prior Publication Data

US 2013/0336194 A1     Dec. 19, 2013

Related U.S. Application Data

(63) Continuation of application No. 12/429,983, filed on Apr. 24, 2009, now Pat. No. 8,520,580.

(51) Int. Cl.
| | |
|---|---|
| H04L 12/66 | (2006.01) |
| H04W 56/00 | (2009.01) |
| H04L 12/18 | (2006.01) |
| H04W 8/08 | (2009.01) |
| H04W 4/06 | (2009.01) |

(52) U.S. Cl.
CPC .......... *H04W 56/001* (2013.01); *H04L 12/189* (2013.01); *H04W 8/08* (2013.01); *H04W 4/06* (2013.01)

(58) Field of Classification Search
CPC ....... H04W 56/001; H04W 8/08; H04W 4/06; H04L 12/189

See application file for complete search history.

(56) References Cited

U.S. PATENT DOCUMENTS

| | | | |
|---|---|---|---|
| 7,035,940 | B2 | 4/2006 | Sahasrabudhe et al. |
| 7,792,025 | B2 | 9/2010 | Segel et al. |
| 7,817,599 | B2 | 10/2010 | Dorenbosch et al. |
| 7,852,794 | B2 | 12/2010 | Venkatachalam |
| 7,970,416 | B2 | 6/2011 | Kim |
| 8,279,833 | B2 | 10/2012 | Kang et al. |
| 2002/0131387 | A1 | 9/2002 | Pitcher et al. |

(Continued)

OTHER PUBLICATIONS

Deering, Network Working Group Request for Comments: 1112, Obsoletes: RFCs 988, 1054, "Host Extensions for IP Multicasting", Aug. 1989, pp. 1-17.

(Continued)

*Primary Examiner* — Jay P Patel

(74) *Attorney, Agent, or Firm* — Mannava & Kang, P.C.

(57) ABSTRACT

A method includes subsequent to a client associating with a first access node and the client being communicatively coupled with a first controller through the first access node: storing information on one or more of: active broadcast sessions for the client or active multicast sessions for the client. The method further includes subsequent to the client associating with a second access node and the client being communicatively coupled with a second controller through the second access node: the second controller establishing one or more of: the active broadcast sessions for the client or the active multicast sessions for the client using the information.

15 Claims, 1 Drawing Sheet

(56) References Cited

U.S. PATENT DOCUMENTS

| | | |
|---|---|---|
| 2004/0132402 A1 | 7/2004 | Agashe et al. |
| 2005/0054349 A1 | 3/2005 | Balachandran et al. |
| 2005/0075107 A1 | 4/2005 | Wang et al. |
| 2005/0249142 A1 | 11/2005 | Kim et al. |
| 2006/0221993 A1 | 10/2006 | Liao et al. |
| 2006/0274693 A1 | 12/2006 | Nikander et al. |
| 2007/0086458 A1 | 4/2007 | Narayanan et al. |
| 2007/0153741 A1 | 7/2007 | Blanchette et al. |
| 2008/0031194 A1 | 2/2008 | Yaqub |
| 2008/0132240 A1 | 6/2008 | Baek et al. |
| 2008/0151808 A1 | 6/2008 | O'Neill |
| 2008/0175238 A1 | 7/2008 | Venkatachalam |
| 2008/0225769 A1 | 9/2008 | Noisette et al. |
| 2008/0267144 A1* | 10/2008 | Jano et al. .............. 370/338 |
| 2009/0036152 A1 | 2/2009 | Janneteau et al. |
| 2009/0061881 A1 | 3/2009 | Gonsa et al. |
| 2009/0080359 A1 | 3/2009 | Song et al. |
| 2009/0168680 A1 | 7/2009 | Singh et al. |
| 2009/0319845 A1 | 12/2009 | Liu et al. |
| 2010/0172293 A1 | 7/2010 | Toth et al. |
| 2010/0278091 A1 | 11/2010 | Sung et al. |
| 2012/0039230 A1 | 2/2012 | Blanchette et al. |

OTHER PUBLICATIONS

Fenner, Network Working Group Request for Comments: 2236, Updates: 1112, Category: Standards Track, "Internet Group Management Protocol, Version 2", Nov. 1997, pp. 1-24.

Cain et al., Network Working Group Request for Comments: 3376, Obsoletes: 2236, Category: Standards Track, "Internet Group Management Protocol, Version 2", Oct. 2002, pp. 1-53.

U.S. Appl. No. 12/429,983 Final Office Action, mailed Oct. 26, 2012.

U.S. Appl. No. 12/429,983 Final Office Action, mailed May 12, 2011.

U.S. Appl. No. 12/429,983 Final Office Action, mailed Sep. 1, 2010.

U.S. Appl. No. 12/429,983 Non Final Office Action, mailed Apr. 2, 2012.

U.S. Appl. No. 12/429,983 Non Final Office Action, mailed Nov. 23, 2010.

U.S. Appl. No. 12/429,983 Non Final Office Action, mailed Mar. 2, 2010.

* cited by examiner

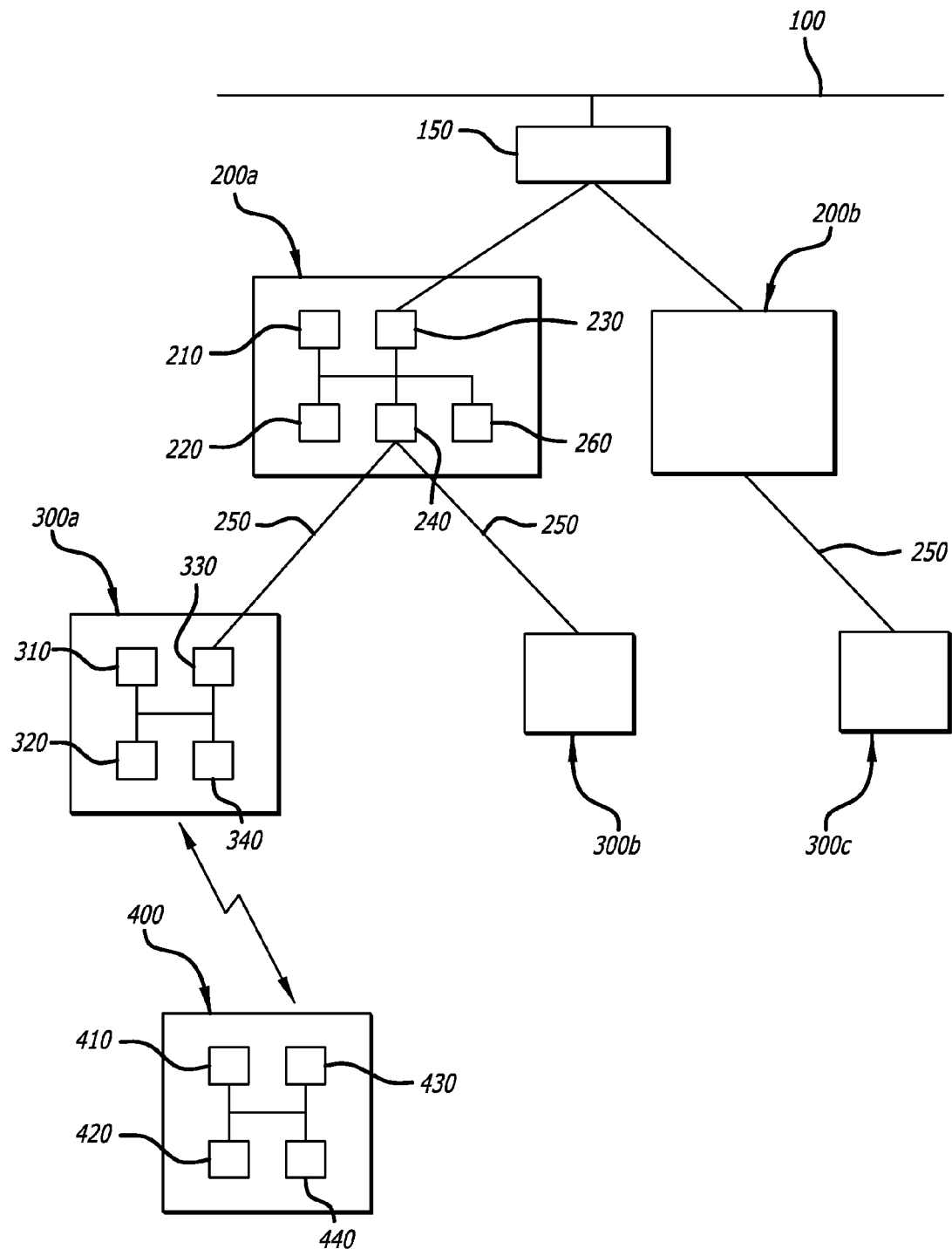

SYNCHRONIZATION OF MOBILE CLIENT MULTICAST

BENEFIT CLAIM

Incorporation by Reference

This application claims priority as a Continuation of application Ser. No. 12/429,983 filed on Apr. 24, 2009, the contents of which are hereby incorporated by reference.

The applicant(s) hereby rescind any disclaimer of claim scope in the parent application(s) or the prosecution history thereof and advice the USPTO that the claims in this application may be broader than any claim in the parent application(s).

BACKGROUND OF THE INVENTION

The present invention relates to wireless systems, and in particular, to the problem of synchronizing multicast data streams to mobile clients in the wireless environment.

Modern wireless systems operating under IEEE 802.11 standards are called upon to support a wide range of clients operating over a wide range of data rates, using different modulation types, and different protocols.

The users of these networks see, or desire to see a set of services, available on demand, wherever they are. They expect these services to operate reliably, and continue to operate as they move, for example, from one area to another in an office environment, or from one building or floor to another in a corporate campus.

Broadcast/multicast (BCMC) traffic in an 802.11 wireless network belongs to a single broadcast domain, such as one or more wireless access nodes connected to a controller. This BCMC traffic cannot be leaked or shared across multiple different domains. This BCMC traffic is usually managed according through the well known Internet Group Management Protocol (IGMP) as defined for example in RFC 1112 (IGMP V1), RFC 2236 (IGMP V2) and RFC 3376 (IGMP V3), each incorporated herein by reference.

When a mobile client crosses a Layer 3 (L3) boundary, for example moving from an area covered by one controller and its wireless access nodes to an area covered by a different controller and its wireless access nodes, existing protocols allow the wireless client to retain its IP address.

But the BCMC traffic to and from the client is restricted to a single broadcast domain. When the mobile client crosses a L3 boundary, these BCMC sessions are dropped until the client rejoins these BCMC sessions.

What is needed is a way to maintain multicast membership and sessions as wireless clients move across boundaries.

BRIEF DESCRIPTION OF THE DRAWINGS

The invention may be best understood by referring to the following description and accompanying drawings that are used to illustrate embodiments of the invention in which:

FIG. 1 shows a wireless 802.11 network.

DETAILED DESCRIPTION

Embodiments of the invention relate to methods of synchronizing mobile client multicast membership in wireless data networks. According to an aspect of the invention, a controller supports one or more wireless access nodes, the access nodes supporting wireless clients. A Mobility Manager (MM) in the controller monitors the activity of the wireless clients. When a wireless client attempts to join a multicast group using an IGMP multicast join, an IGMP proxy in the controller intercepts these IGMP control messages, joining the multicast group for the client, and establishing itself as the client's home agent (HA). This activity is tracked by the Mobility Manager. Subsequent IGMP messages from that or other clients on the controller are handled by the IGMP proxy acting on their behalf, and are also tracked by the Mobility Manager. The IGMP proxy in the controller performs joins and acts as a host for each BCMC client of its wireless access nodes.

When a client moves from its home agent (HA) controller to a foreign agent (FA) controller, downstream multicast traffic for the client is still received by the IGMP proxy at the HA. The Mobility Manager in the FA contacts the Mobility Manager in the HA and receives information on any active multicast traffic associated with the client; the Mobility Manger in the FA then establishes those multicast connections for the client through its own IGMP proxy, which forwards the multicast streams to the client.

As shown in FIG. 1, a wireless network operating according to 802.11 standards supports connections of wireless clients 400 to a wired network. Wired network 100, such as a wired IEEE 802.3 Ethernet network, is connected to layer 3 router 150, which supports controllers 200a, 200b. Controllers 200 support connections 250 to access nodes 300a, 300b, 300c. These access nodes provide wireless communications to wireless clients such as wireless client 400.

As is understood in the art, controllers 200 are a purpose-built digital devices having a CPU 210, memory hierarchy 220, and a plurality of network interfaces 230, 240. CPU 210 may be a MIPS-class processor from companies such as Raza Microelectronics or Cavium Networks, although CPUs from companies such as Intel, AMD, IBM, Freescale, or the like may also be used. Memory hierarchy 220 includes read-only memory for device startup and initialization, high-speed read-write memory such as DRAM for containing programs and data during operation, and bulk memory such as hard disk or compact flash for permanent file storage of programs and data. Network interface 230 is typically an IEEE 802.3 Ethernet interface to copper, although high-speed optical fiber interfaces may also be used. Controller 200 typically operates under the control of purpose-built embedded software, typically running under a Linux operating system, or an operating system for embedded devices such as VXWorks. Network interface 240 is typically a wireless interface operating under IEEE 802.11 standards.

Similarly, as understood by the art, wireless access nodes 300a, 300b and 300c, are also purpose-built digital devices. These access nodes include CPU 310, memory hierarchy 320, wired interface 330, and wireless interface 340. As with controller 200, the CPU commonly used for such access nodes is a MIPS-class CPU such as one from Raza Microelectronics or Cavium Networks, although processors from other vendors such as Intel, AMD, Freescale, and IBM may be used. The memory hierarchy comprises read-only storage for device startup and initialization, fast read-write storage such as DRAM for holding operating programs and data, and permanent bulk file storage such as compact flash. Wireless access nodes 300 typically operate under control of purpose-built programs running on an embedded operating system such as Linux or VXWorks. Wireless interface 340 is typically an interface operating to the family of IEEE 802.11 standards including but not limited to 802.11a, b, g, and/or n.

Wireless client 400 is also a digital device, similarly having CPU 410, memory hierarchy 420, wireless interface 430, and I/O devices 440. As examples, wireless device 500 may be a general purpose computer such as a laptop, or may be a purpose-built device such as a Wi-Fi phone or a handheld scanner. In a general-purpose computer, CPU 410 may be a processor from companies such as Intel, AMD, Freescale, or the like. In the case of purpose-built devices, Acorn or MIPS class processors may be preferred. Memory hierarchy 420 comprises the similar set of read-only memory for device startup and initialization, fast read-write memory for device operation and holding programs and data during execution, and permanent bulk file storage using devices such as flash, compact flash, and/or hard disks. Additional I/O devices 440 may be present, such as keyboards, displays, speakers, barcode scanners, and the like.

According to an aspect of the invention, Mobility Manager (MM) 270 operates in controller 200a, monitoring the activity of connected wireless clients. Assuming client 400 is connected to controller 200a through access node 300a, when wireless client 400 issues an IGMP control message, this IGMP control message is intercepted by controller 200a. If an IGMP proxy process 250 does not exist on controller 200a, one is started. This IGMP Proxy 250 will trap and handle all IGMP messages from wireless clients of controller 200a, and act in their behalf.

As an example, if client 400 sends an IGMP join to join a multicast, IGMP Proxy 250 on controller 200a will trap this request, and then send its own IGMP join request upstream, joining the multicast as a proxy for client 400. The IGMP Proxy on controller 200a can act as a host for other wireless clients wishing to join the same (or a different) multicast.

The activity of IGMP Proxy 250 is monitored by Mobility Manager 270. As is understood by the art, this may be through the use of shared data structures or other software methods whereby Mobility Manager 270 tracks the activities of client 400 including any activity of client 400 through IGMP proxy 250. It is understood that Mobility Manager 270 is a software process running in controller 200. Mobility Manager 270 may be written in any number of different computer languages such as C or C++, depending on the implementation requirements of the other software components of the controller.

If client 400 moves to a different wireless access node and controller, for example controller 200b through access node 300c, downstream unicast traffic for client 400 will be forwarded to client 400 through the new controller 200b. Multicast traffic, however, is not forwarded.

According to an aspect of the invention, when client 400 roams from home agent (HA) controller 200a to foreign agent (FA) controller 200b, the Mobility Manager 270 in FA controller 200b sends queries to Mobility Managers 270 in all controllers 200 in its mobility domain to determine the HA controller for client 400. When the Mobility Manager 270 in controller 200a identifies itself as the HA for client 400, the Mobility Manager 270 in HA controller 200a sends information to Mobility Manager 270 in FA controller 200b, including information on any open IGMP multicasts being handled for client 400 through the IGMP proxy 250 in HA 200a. Mobility Manager 270 in FA controller 200b then uses this information with its own IGMP proxy to join the required multicasts and send the multicast traffic to client 400.

This process is facilitated by having the IGMP proxy 250 in each controller 200 keep multicast databases of the clients 400 it serves and sharing this information with the Mobility Manager in the controller. When a client roams from its home agent to a foreign agent, the Mobility Manager in the foreign agent locates the home agent and receives information from the Mobility Manager in the home agent, including information on active multicast streams for the client.

While the invention has been described in terms of various embodiments, the invention should not be limited to only those embodiments described, but can be practiced with modification and alteration within the spirit and scope of the appended claims. The description is this to be regarded as illustrative rather than limiting.

What is claimed is:

1. A non-transitory computer readable medium comprising instructions which, when executed by one or more processors on one or more devices, causes performance of operations comprising:
    subsequent to a client associating with a first access node and the client being communicatively coupled with a first controller through the first access node: storing information on one or more of: active broadcast sessions for the client or active multicast sessions for the client;
    subsequent to the client associating with a second access node and the client being communicatively coupled with a second controller through the second access node, wherein the stored information is received by the second controller from the first controller;
    detecting, by the second controller, that the client is communicatively coupled to the second controller through the second access node;
    responsive at least to detecting that the client is communicatively coupled to the second controller: sending, by the second controller, an inquiry for the information on one or more of: the active broadcast sessions for the client or the active multicast sessions for the client;
    receiving, by the second controller, the information on one or more: the active broadcast sessions for the client or the active multicast sessions for the client;
    using, by the second controller, the information to establish one or more of: the active broadcast sessions for the client or the active multicast sessions for the client,
    wherein the second controller comprises a hardware processor.

2. The medium of claim 1 wherein the inquiry is sent by the second controller prior to the client transmitting any request to the second access node to join a broadcast session or a multicast session.

3. The medium of claim 1 wherein the operations further comprise establishing, by the second controller, the one or more of: the active broadcast sessions for the client or the active multicast sessions for the client using an IGMP proxy of the second controller.

4. The medium of claim 1 wherein the operations further comprise receiving, by the second controller from the
    first controller, a forwarded unicast message directed to the client.

5. The medium of claim 1 wherein the information on the one or more: the active broadcast sessions for the client or the active multicast sessions for the client is received by the second controller from the first access node.

6. A system comprising:
    a first controller including a first hardware processor;
    a second controller including a second hardware processor;
    the system being configured to perform operations comprising:
    subsequent to a client associating with a first access node and the client being communicatively coupled with a first controller through the first access node: storing information on one or more of: active broadcast sessions for the client or active multicast sessions for the client;
    subsequent to the client associating with a second access node and the client being communicatively coupled with a second controller through the second access node, wherein the stored information is received by the second controller from the first controller;

detecting, by the second controller, that the client is communicatively coupled to the second controller through the second access node;

responsive at least to detecting that the client is communicatively coupled to the second controller: sending, by the second controller, an inquiry for the information on one or more of: the active broadcast sessions for the client or the active multicast sessions for the client;

receiving, by the second controller, the information on one or more: the active broadcast sessions for the client or the active multicast sessions for the client;

using, by the second controller, the information to establish one or more of: the active broadcast sessions for the client or the active multicast sessions for the client.

7. The system of claim 6 wherein the inquiry is sent by the second controller prior to the client transmitting any request to the second access node to join a broadcast session or a multicast session.

8. The system of claim 6 wherein the operations further comprise establishing, by the second controller, the one or more of: the active broadcast sessions for the client or the active multicast sessions for the client using an IGMP proxy of the second controller.

9. The system of claim 6 wherein the operations further comprise receiving, by the second controller from the first controller, a forwarded unicast message directed to the client.

10. The system of claim 6 wherein the information on the one or more: the active broadcast sessions for the client or the active multicast sessions for the client is received by the second controller from the first access node.

11. A method comprising:
subsequent to a client associating with a first access node and the client being communicatively coupled with a first controller through the first access node: storing information on one or more of: active broadcast sessions for the client or active multicast sessions for the client;
subsequent to the client associating with a second access node and the client being communicatively coupled with a second controller through the second access node, wherein the stored information is received by the second controller from the first controller;

detecting, by the second controller, that the client is communicatively coupled to the second controller through the second access node;

responsive at least to detecting that the client is communicatively coupled to the second controller: sending, by the second controller, an inquiry for the information on one or more of: the active broadcast sessions for the client or the active multicast sessions for the client;

receiving, by the second controller, the information on one or more: the active broadcast sessions for the client or the active multicast sessions for the client;

using, by the second controller, the information to establish one or more of: the active broadcast sessions for the client or the active multicast sessions for the client, wherein the second controller comprises a hardware processor.

12. The method of claim 11 wherein the inquiry is sent by the second controller prior to the client transmitting any request to the second access node to join a broadcast session or a multicast session.

13. The method of claim 11 further comprising establishing, by the second controller, the one or more of: the active broadcast sessions for the client or the active multicast sessions for the client using an IGMP proxy of the second controller.

14. The method of claim 11 further comprising receiving, by the second controller from the first controller, a forwarded unicast message directed to the client.

15. The method of claim 11 wherein the information on the one or more: the active broadcast sessions for the client or the active multicast sessions for the client is received by the second controller from the first access node.

* * * * *

UNITED STATES PATENT AND TRADEMARK OFFICE
CERTIFICATE OF CORRECTION

PATENT NO. : 9,167,543 B2  
APPLICATION NO. : 13/968256  
DATED : October 20, 2015  
INVENTOR(S) : Shankar Kambat Ananthanarayanan et al.

Page 1 of 1

It is certified that error appears in the above-identified patent and that said Letters Patent is hereby corrected as shown below:

Claims

In column 4, line 21, in Claim 1, delete "controller:" and insert -- controller; --, therefor.

In column 5, line 2, in Claim 6, delete "controller:" and insert -- controller; --, therefor.

In column 6, line 5, in Claim 11, delete "controller:" and insert -- controller; --, therefor.

Signed and Sealed this  
Twenty-fourth Day of May, 2016

Michelle K. Lee  
*Director of the United States Patent and Trademark Office*